(12) United States Patent
Isowaki et al.

(10) Patent No.: US 8,029,682 B2
(45) Date of Patent: Oct. 4, 2011

(54) METHOD OF MANUFACTURING MAGNETIC RECORDING MEDIUM

(75) Inventors: Yousuke Isowaki, Yokohama (JP);
Kaori Kimura, Kawasaki (JP);
Yoshiyuki Kamata, Tokyo (JP);
Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/705,456

(22) Filed: Feb. 12, 2010

(65) Prior Publication Data

US 2010/0215989 A1    Aug. 26, 2010

(30) Foreign Application Priority Data

Feb. 20, 2009   (JP) .................................. 2009-038207

(51) Int. Cl.
    *B44C 1/22*    (2006.01)
(52) U.S. Cl. ............... 216/22; 216/40; 216/75; 438/754
(58) Field of Classification Search .................... 216/22, 216/40, 51, 67, 75; 438/736, 754, 785
    See application file for complete search history.

(56) References Cited

U.S. PATENT DOCUMENTS

| 6,221,519 | B1 | 4/2001 | Doi et al. |
|---|---|---|---|
| 6,266,354 | B1 | 7/2001 | Chino et al. |
| 6,984,529 | B2* | 1/2006 | Stojakovic et al. ............... 438/3 |
| 7,067,207 | B2 | 6/2006 | Kamata et al. |
| 2004/0020894 | A1* | 2/2004 | Williams et al. ................. 216/14 |
| 2004/0253817 | A1 | 12/2004 | Imada et al. |
| 2005/0000934 | A1* | 1/2005 | Nakatani et al. ................. 216/13 |
| 2005/0243467 | A1 | 11/2005 | Takai et al. |
| 2005/0284842 | A1 | 12/2005 | Okawa et al. |
| 2006/0021966 | A1 | 2/2006 | Hattori et al. |
| 2006/0124585 | A1 | 6/2006 | Suwa et al. |
| 2006/0183004 | A1* | 8/2006 | Hattori et al. .............. 428/833.1 |
| 2006/0222897 | A1 | 10/2006 | Kamata et al. |
| 2006/0222899 | A1 | 10/2006 | Sugimura et al. |

(Continued)

FOREIGN PATENT DOCUMENTS

JP    02-207418    8/1990

(Continued)

OTHER PUBLICATIONS

Translation of the Notice of Reasons for Rejection mailed by JPO on Oct. 13, 2009 for Japanese Patent Application No. 2008-192537 (corresponding to U.S. Appl. No. 12/508,269).*

(Continued)

*Primary Examiner* — Lan Vinh (74) *Attorney, Agent, or Firm* — Knobbe Martens Olson & Bear, LLP (57) ABSTRACT

According to one embodiment, a method of manufacturing a magnetic recording medium includes forming a first hard mask, a second hard mask and a resist on a magnetic recording layer, imprinting a stamper to the resist to transfer patterns of protrusions and recesses to the resist, removing residues remaining in the recesses of the patterned resist, etching the second hard mask by using the patterned resist as a mask to transfer the patterns of protrusions and recesses to the second hard mask, etching the first hard mask by using the second hard mask as a mask to transfer the patterns of protrusions and recesses to the first hard mask, subjecting the magnetic recording layer exposed in the recesses to modifying treatment to change an etching rate, and deactivating the magnetic recording layer exposed in the recesses.

10 Claims, 3 Drawing Sheets

U.S. PATENT DOCUMENTS

| | | | |
|---|---|---|---|
| 2007/0059562 A1* | 3/2007 | Hattori et al. | 428/836 |
| 2007/0070547 A1 | 3/2007 | Kamata et al. | |
| 2007/0211592 A1* | 9/2007 | Sakurai et al. | 369/47.49 |
| 2007/0224339 A1 | 9/2007 | Kamata et al. | |
| 2007/0263324 A1 | 11/2007 | Allen et al. | |
| 2007/0281078 A1 | 12/2007 | Kikitsu et al. | |
| 2008/0075845 A1 | 3/2008 | Sonobe et al. | |
| 2008/0078739 A1 | 4/2008 | Hibi et al. | |
| 2008/0093336 A1 | 4/2008 | Lee et al. | |
| 2008/0158718 A1 | 7/2008 | Kobayashi et al. | |
| 2008/0174914 A1 | 7/2008 | Takai et al. | |
| 2008/0217615 A1 | 9/2008 | Kerber | |
| 2009/0023078 A1 | 1/2009 | Gutmann et al. | |
| 2009/0305081 A1 | 12/2009 | Dai et al. | |
| 2009/0308837 A1 | 12/2009 | Albrecht et al. | |
| 2010/0018946 A1 | 1/2010 | Isowaki et al. | |
| 2010/0018947 A1 | 1/2010 | Kimura et al. | |
| 2010/0047625 A1 | 2/2010 | Kamata et al. | |
| 2010/0053813 A1 | 3/2010 | Fukushima et al. | |
| 2010/0059476 A1 | 3/2010 | Yamamoto et al. | |
| 2010/0147791 A1 | 6/2010 | Isowaki et al. | |
| 2010/0214694 A1 | 8/2010 | Kimura et al. | |
| 2010/0214695 A1 | 8/2010 | Isowaki et al. | |

FOREIGN PATENT DOCUMENTS

| | | | |
|---|---|---|---|
| JP | 03-040219 | | 2/1991 |
| JP | 05-205257 | | 8/1993 |
| JP | 11-328652 | | 11/1999 |
| JP | 2000-286241 | | 10/2000 |
| JP | 2002-501300 | | 1/2002 |
| JP | 2002-359138 | | 12/2002 |
| JP | 2003-183859 | | 7/2003 |
| JP | 2004-164692 | | 6/2004 |
| JP | 2004-164692 A | | 6/2004 |
| JP | 2005-042143 | | 2/2005 |
| JP | 2005-050468 | | 2/2005 |
| JP | 2005-050468 A | | 2/2005 |
| JP | 2005-056535 | | 3/2005 |
| JP | 2005-070650 | | 3/2005 |
| JP | 2005-071542 | | 3/2005 |
| JP | 2005-317155 | | 11/2005 |
| JP | 2005-317155 A | | 11/2005 |
| JP | 2006-012332 | | 1/2006 |
| JP | 2006-012332 A | | 1/2006 |
| JP | 2006-147148 | | 6/2006 |
| JP | 2006-196143 | | 7/2006 |
| JP | 2007-095115 | | 4/2007 |
| JP | 2008-065944 | | 3/2008 |
| JP | 2008-065944 A | | 3/2008 |
| JP | 2008-135092 | | 6/2008 |
| JP | 2008-210450 | | 9/2008 |
| JP | 2009-076924 | | 4/2009 |
| JP | 2009-170007 | | 7/2009 |
| JP | 2009-181674 | | 8/2009 |
| JP | 2009-301655 | * | 12/2009 |
| JP | 2010-033636 | * | 2/2010 |
| WO | WO 99/35657 | * | 7/1999 |
| WO | WO 2008/069082 | * | 6/2008 |

OTHER PUBLICATIONS

Translation of the Notice of Reasons for Rejection mailed by JPO on Mar. 9, 2010 for Japanese Patent Application No. 2008-317382 (corresponding to U.S. Appl. No. 12/636,610).*

Translation of the Notice of Reasons for Rejection mailed by JPO on Nov. 17, 2009 for Japanese Patent Application No. 2008-213674 (corresponding to U.S. Appl. No. 12/544,606).*

Translation of the Notice of Reasons for Rejection mailed by JPO on Oct. 13, 2010 for Japanese Patent Application No. 2008-192536 (corresponding to U.S. Appl. No. 12/509,261).*

Translation of the Notice of Reasons for Rejection mailed by JPO on Feb. 2, 2010 for Japanese Patent Application No. 2008-192536 (corresponding to U.S. Appl. No. 12/509,261).*

Translation of the Notice of Reasons for Rejection mailed by JPO on Apr. 20, 2010 for Japanese Patent Application No. 2009-038207 (corresponding to U.S. Appl. No. 12/705,456).*

Translation of the Notice of Reasons for Rejection mailed by JPO on Apr. 20, 2010 for Japanese Patent Application No. 2009-038206 (corresponding to U.S. Appl. No. 12/705,490).*

Translation of the Notice of Reasons for Rejection mailed by JPO on Apr. 20, 2010 for Japanese Patent Application No. 2009-038208 (corresponding to U.S. Appl. No. 12/705,421).*

Explanation of Non-English Language References.

* cited by examiner

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2009-038207, filed Feb. 20, 2009, the entire contents of which are incorporated herein by reference.

BACKGROUND

1. Field

One embodiment of the present invention relates to a method of manufacturing a magnetic recording medium such as a patterned medium.

2. Description of the Related Art

In a recoding medium wherein protrusions and recesses are formed on the surface thereof, such as a discrete track recoding (DTR) medium, in order to write and read by means of a flying head, it is necessary to reduce the protrusions and recesses on the surface to a degree which allows stable flying of the head. In a conventional DTR medium, in order to separate adjacent tracks completely from each other, for example, 20 nm of ferromagnetic recording layer and 5 nm of protecting layer, 25 nm in total, are removed. On the other hand, a flying level of the head is designed to be about 10 nm. Thus, there has been used a method to smooth the surface of the medium by filling the grooves with a nonmagnetic material, or to modify the non-recording region into nonmagnetic material without forming a construction of protrusions and recesses on the DTR medium.

In a method disclosed in Jpn. Pat. Appln. KOKAI Publication Nos. 2005-50468 and 2006-12332, after patterns of protrusions and recesses are formed by using two-layered hard mask, grooves are filled with a nonmagnetic material to smooth the surface of a medium. However, such a method may require increased number of steps of manufacturing, and can increase the cost and decrease the yield.

Moreover, in such a process that only modifies the non-recording region into a nonmagnetic material without forming a construction of protrusions and recesses, the boundary between the non-recording region and the recording region is fluctuated, which may be a cause of noise. At the same time, there is a problem how to modify the magnetism of the non-recording region without modifying the magnetism of the recording region.

Therefore, there has been a need for providing a method of manufacturing a recording medium which efficiently inhibits the magnetism of the non-recording region with minimum deterioration of the smoothness of the surface of the recording medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of manufacturing a magnetic recording medium, comprising: forming a first hard mask, a second hard mask and a resist on a magnetic recording layer; imprinting a stamper to the resist to transfer patterns of protrusions and recesses to the resist; removing residues remaining in the recesses of the patterned resist; etching the second hard mask by using the patterned resist as a mask to transfer the patterns of protrusions and recesses to the second hard mask; etching the first hard mask by using the second hard mask as a mask to transfer the patterns of protrusions and recesses to the first hard mask; subjecting the magnetic recording layer exposed in the recesses to a modifying treatment to change an etching rate; and deactivating the magnetic recording layer exposed in the recesses.

Figure 1:
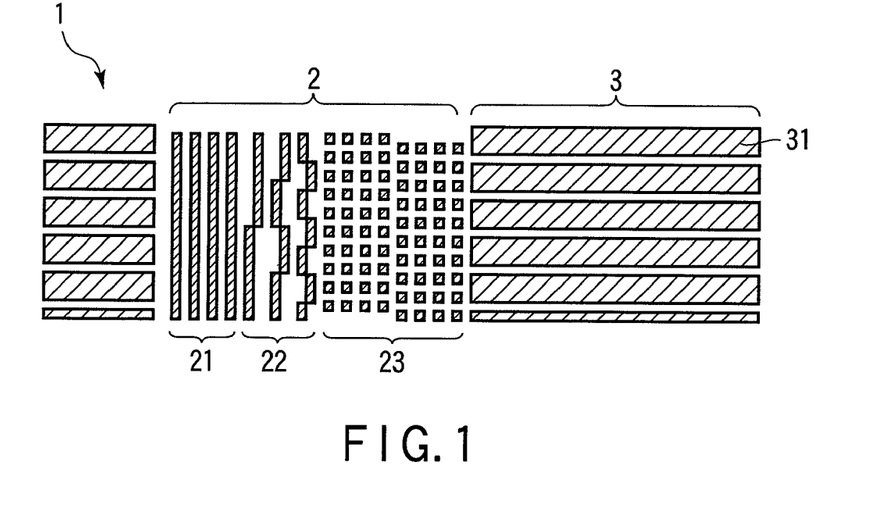
FIG. 1 is a plane view of a discrete track recording medium (DTR medium) manufactured by the method of the present invention along the circumferential direction.

FIG. 1 shows a plane view of a discrete track recording medium (DTR medium) which is an example of the patterned medium manufactured by the method of the present invention along the circumferential direction. As shown in FIG. 1, a servo region 2 and a data region 3 are alternately formed along the circumferential direction of a patterned medium 1. The servo region 2 includes a preamble section 21, an address section 22 and a burst section 23. The data region 3 includes discrete tracks 31 wherein adjacent tracks are separated from each other.

Figure 2:
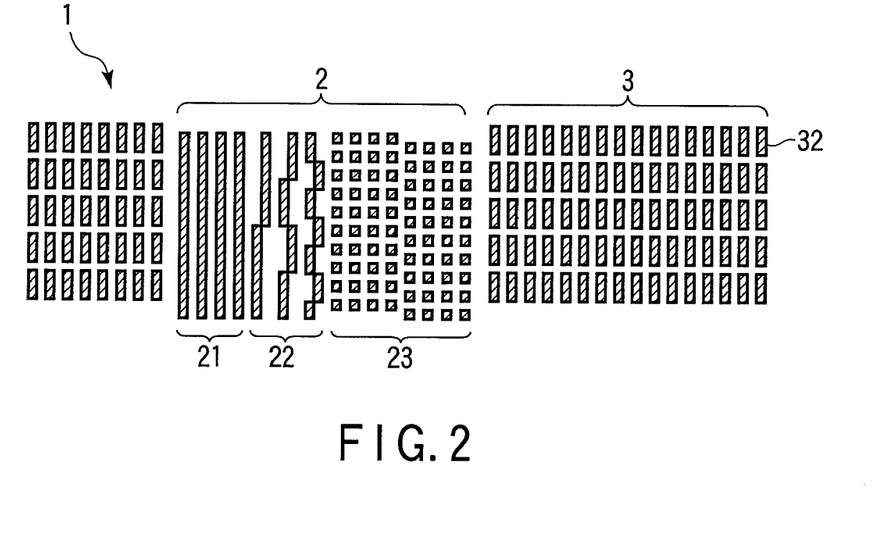
FIG. 2 is a plane view of a bit-patterned medium manufactured by the method of the present invention along the circumferential direction.

FIG. 2 shows a plane view of a bit-patterned medium (BPM) which is another example of the patterned medium manufactured by the method of the present invention along the circumferential direction. In this patterned medium, magnetic dots 32 are formed on the data region 3.

An example of the method of manufacturing a magnetic recording medium according to the present invention will be explained with reference to FIGS. 3A to 3I.

Figure 3A:
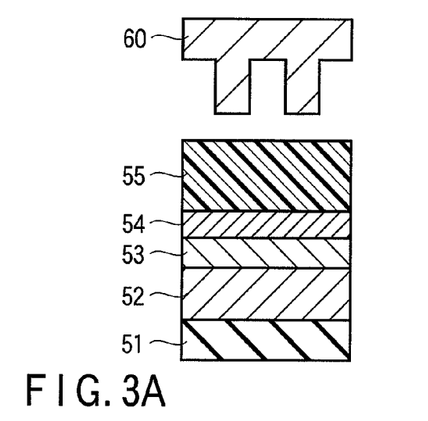
FIGS. 3A to 3I are sectional views showing an example of the method of manufacturing a magnetic recording medium according to the present invention.

As shown in FIG. 3A, on a glass substrate 51, an underlayer (not shown) and a magnetic recording layer 52 having a thickness of 20 nm are deposited. On the magnetic recording layer 52, a first hard mask 53 made of carbon having a thickness of 15 nm and a second hard mask 54 made of Cu having a thickness of 3 nm are deposited. A resist 55 is spin-coated on the second hard mask 54. On the other hand, a stamper 60 is prepared. The stamper 60 comprises predetermined patterns of protrusions and recesses formed thereon, which correspond to, for example, the patterns of the DTR medium as shown in FIG. 1. The stamper 60 is manufactured through processes of electron beam lithography, Nickel electroforming and injection molding. The stamper 60 is disposed with its surface of the protrusions and recesses facing the resist 55.

Figure 3B:
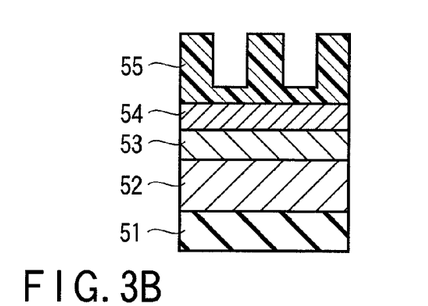

As shown in FIG. 3B, the resist 55 is imprinted with the stamper 60 to transfer the patterns of protrusions and recesses of the stamper 60 to the resist 55. After that, the stamper 60 is removed. Resist residues are left on the bottom of the recesses of the patterns which have been transferred to the resist 55.

Figure 3C:
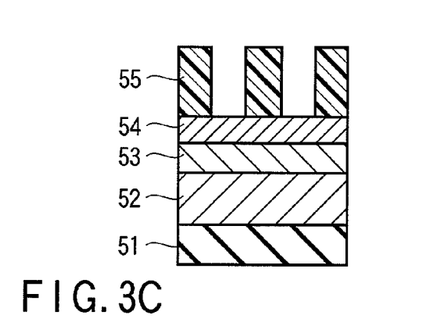

As shown in FIG. 3C, the resist residues in the recesses are removed by dry etching so that the surface of the second hard mask 54 is exposed. In this process, the resist residues are removed for example by an ICP-RIE system using oxygen as an etching gas.

Figure 3D:
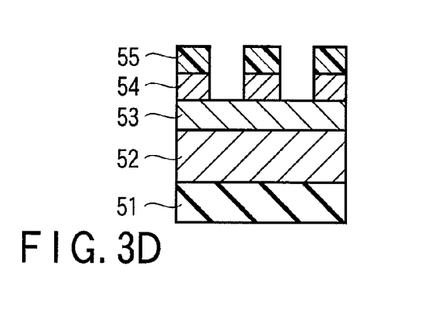

As shown in FIG. 3D, the resist patterns are transferred to the second hard mask 54 using the patterned resist 55 as a mask, by means of ion beam etching. Argon may be used as an etching gas, but the gas is not particularly limited. Also, the etching device is not particularly limited, but for an example, an RIE system may be used.

Figure 3E:
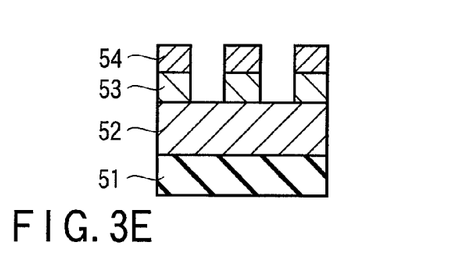

As shown in FIG. 3E, using the patterned second hard mask 54 as a mask, the first hard mask 53 is etched to transfer the patterns. As a result, the surface of the magnetic recording layer 52 is exposed in the recesses. The etching is carried out, for example, by an ICP-RIE system using oxygen as an etching gas. At the same time, the resist left on the patterns of the second hard mask 54 is partially or entirely stripped off. Thus the patterns of protrusions and recesses mainly comprising the first hard mask 53 and the second hard mask 54 are formed.

Figure 3F:
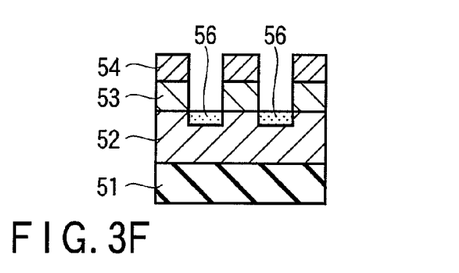

As shown in FIG. 3F, modifying treatment to change the etching rate of the magnetic recording layer 52 exposed in the recesses is carried out. The modifying treatment to change the etching rate may be carried out, for example, by an ICP-RIE system using $CF_4$ as an etching gas. By this treatment, the magnetic recording layer 52 exposed in the recesses are changed into modified regions 56 to a certain depth from the surface of the layer 52.

Figure 3G:
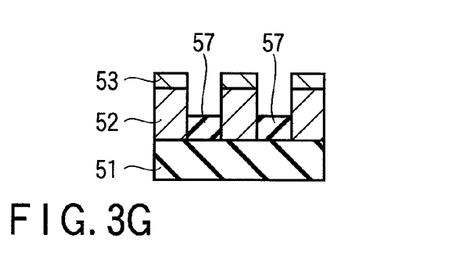

As shown in FIG. 3G, the remaining second hard mask 54 and the modified regions 56 are removed, for example, by means of ion beam etching, using a mixed gas of He—$N_2$ as an etching gas. At the same time, the magnetic recording layer 52 exposed in the recesses is deactivated to form a nonmagnetic layer 57. When the second hard mask 54 is removed, the magnetic recording layer 52 exposed in the recesses may be partially etched. However, since the magnetic recording layer 52 exposed in the recesses has already been deactivated and has been changed to be nonmagnetic, an excellent fringe property can be obtained when the processed medium is installed in a hard disk drive. Incidentally, as an ion beam apparatus used in this process, for example, ECR ion gun may be used.

Figure 3H:
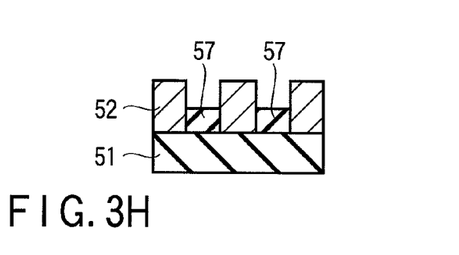

As shown in FIG. 3H, the remaining first hard mask 53 is removed. At this time, the first hard mask 53 is removed, for example, by means of an ICP-RIE system, using oxygen as an etching gas.

Figure 3I:
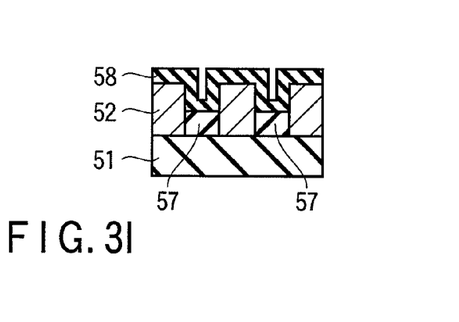

As shown in FIG. 3I, a protective film 58 having a thickness of 3 nm is formed by means of chemical vapor deposition.

Incidentally, in the above steps, the thickness of various types of films and the depth of the recesses can easily be measured, for example, by means of an atomic force microscope (AFM), cross-sectional transmission electron microscope (TEM) or the like. Also, the type of metal mask and the composition ratio thereof can easily be measured by performing energy dispersive X-ray spectroscopy (EDX) analysis. It is also possible to investigate the type of etching gas used in the ion beam etching and the effect thereof by subjecting the finished medium to X-ray photoelectron spectroscopy (XPS) analysis wherein the gas remaining within the medium is analyzed. Additionally, the method of manufacture shown in FIGS. 3A to 3I can be applied not only to a manufacture of DTR medium but also to a manufacture of bit-patterned media (BPM).

Hereinafter, the process of FIG. 3F is explained in more detail. According to the present invention, in the step of FIG. 3F, the magnetic recording layer 52 exposed in the recesses is subjected to a modifying treatment to change the etching rate.

By performing the modifying treatment to change the etching rate of the magnetic recording layer 52 exposed in the recesses as shown in FIG. 3F, prior to the ion beam etching shown in FIG. 3G, the etching rate can be increased in the step of ion beam etching. When the etching rate is increased, it is possible to take higher etching selectivity relative to the hard mask material, and to shorten the etching time. As a result, patterns having a good configuration with a limited taper angle can be manufactured using a thin hard mask.

In a case where the magnetic recording layer 52 exposed in the recesses is deactivated for example by means of ion beam etching which uses a mixed gas of He—$N_2$, the modifying treatment of the magnetic recording layer 52 to change the etching rate enables the deactivating ion of He and $N_2$ to reach deeper, and makes the deactivation of the magnetic recording layer 52 more efficient. As a result, it is possible to deactivate the magnetic recording layer 52 exposed in the recesses with a smaller depth and in a shorter time.

The modifying treatment to change an etching rate can be performed by means of reactive ion etching using a fluorine-containing gas such as $CF_4$, $SF_6$ or $CHF_3$. In a case where the second hard mask 54 is a silicon-based material, the treatment may include the step of removing the second hard mask 54 before the ion beam etching.

Etching gas used in the deactivation can include He, $O_2$, $N_2$, a mixed gas of He—$O_2$ and a mixed gas of He—$N_2$—$O_2$, in addition to a mixed gas of He—$N_2$. In a case where He is used in the deactivation, the crystal structure of the magnetic recording layer 52 is destroyed by accelerated He ions to perform the deactivation. Also, in a case where $O_2$ or $N_2$ is used, O atom or N atom is penetrated into the crystal structure and form a compound to perform the deactivation. Further, in a case where He is used in combination with a reactive gas of $N_2$ or $O_2$, the deactivation is performed by the effect of both the gases.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

<First Hard Mask>

Composition of the first hard mask comprises carbon as the main raw material. The proportion of carbon is desirably more than 75% in terms of atom number ratio. When the proportion of carbon is 75% or less, etching selectivity is decreased, resulting in a tendency that a magnetic layer cannot be processed into a good configuration. The first hard mask can be formed of a film which is deposited by means of sputtering or CVD. The thickness of the first hard mask is preferably 4 to 50 nm. If the film is too thick, it takes a long etching time when it is stripped off, thereby damaging the sidewalls of the patterned magnetic layer. If it is too thin, it cannot function as a hard mask for etching. Additionally, an antioxidant layer may optionally be deposited between the first hard mask and the magnetic recording layer.

<Second Hard Mask>

The second hard mask 54 in the method of the present invention desirably has a resistance to gaseous $O_2$ or $O_3$, and desirably comprises Al, Ag, Au, Co, Cr, Cu, Ni, Pd, Pt, Si, Ta or Ti as a main component. For example, each component can be used as simple substance or; nitride, oxide, alloy and mixture of these components can be used. The thickness of the second hard mask 54 is preferably 1 to 15 nm, and more preferably 2 to 10 nm. If the film is too thick, the magnetic recording layer will be damaged at the time of removal of the second hard mask 54. Conversely, if the film is too thin, it cannot be deposited as a uniform film, and therefore patterns cannot be formed on the first hard mask 53.

<Protective Film>

The protective film is provided for the purpose of preventing corrosion of the perpendicular magnetic recording layer and also preventing the surface of a medium from being damaged when the magnetic head is brought into contact with the medium. Examples of the material of the protective film include those containing C, $SiO_2$ or $ZrO_2$. It is preferable to set the thickness of the protective film from 1 to 10 nm. Since such a thin protective film enables to reduce the spacing between the head and medium, it is suitable for high-density recording. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective film for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A stamper having patterns of recording tracks and servo data is pressed against a substrate on which a resist is applied and then the resist is cured, thereby to transfer the patterns of protrusions and recesses.

As the resist, for example, a UV curing resist or a general novolak-type photoresist may be used. When the UV curing resist is used, the stamper is preferably made of a transparent material such as quartz or resin. The UV curing resist is cured by applying ultraviolet ray. A high-pressure mercury lamp, for example, can be used as a light source of the ultraviolet ray. When the general novolak-type photoresist is used, the stamper may be made of a material such as Ni, quartz, Si and SiC. The resist can be cured by applying heat or pressure.

<Removal of Resist Residues>

Resist residues remaining after imprinting are removed by $O_2$ gas RIE (reactive ion etching). As the plasma source, ICP (inductively coupled plasma) apparatus capable of producing high-density plasma under a low pressure is preferable, but an ECR (electron cyclotron resonance) plasma or general parallel-plate RIE apparatus may be used.

<Deactivation>

Deactivation refers to weakening the magnetism of the magnetic recording layer exposed in the recesses relative to the magnetism of the protrusions in a patterned magnetic recording medium. Weakening the magnetism refers to modifying the layer to soft magnetic, nonmagnetic or diamagnetic. These changes in the magnetism can be observed by measuring the values of Hn, Hs or Hc by means of a vibrating sample magnetometer (VSM) or magnetooptic Kerr effect measurement system.

<Deposition of Protective Film and Aftertreatment>

The carbon protective film is preferably deposited by CVD to improve coverage to the protrusions and recesses, but it may be deposited by sputtering or vacuum evaporation. The CVD produces a DLC film containing a large amount of $sp^3$-bonded carbon. A lubricant is applied to the surface of the protective film. As the lubricant, for example, perfluoropolyether, fluorinated alcohol, fluorinated carboxylic acid or the like is used.

Figure 4:
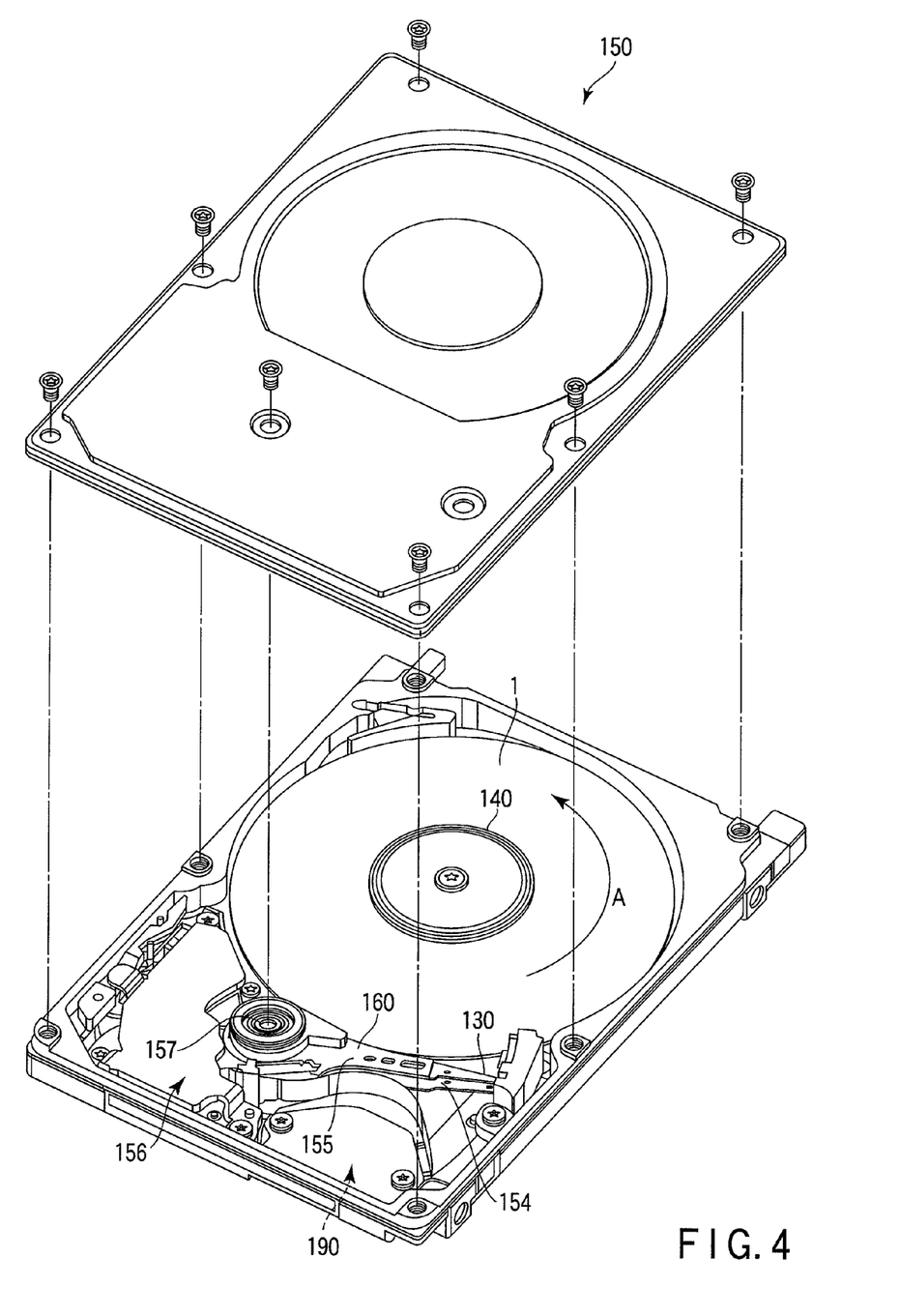
FIG. 4 is a perspective view of a magnetic recording apparatus in which a magnetic recording medium manufactured by the present invention is installed.

Now, the magnetic recording apparatus (HDD) will be described below. FIG. 4 is a perspective view of a magnetic recording apparatus in which the magnetic recording medium manufactured according to the present invention is installed.

As shown in FIG. 4, the magnetic recording apparatus 150 according to the embodiment is of a type using a rotary actuator. The patterned medium 1 is attached to the spindle 140, and is rotated in the direction of arrow A by a motor (not shown) that responds to control signals from a drive controller (not shown). The magnetic recording apparatus 150 may comprise a plurality of patterned media 1.

The head slider 130 configured to read from and write to the patterned medium 1 is attached to the tip of the film-like suspension 154. The head slider 130 has a magnetic head mounted near the tip thereof. When the patterned medium 1 rotates, the air bearing surface (ABS) of the head slider 130 is held at a predetermined height so as to fly over the surface of the magnetic disk 200 under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the patterned medium 1.

EXAMPLES

Example 1

A DTR medium was manufactured by the method shown in FIGS. 3A to 3I using a stamper which has patterns of protrusions and recesses corresponding to the DTR medium shown in FIG. 1. The conditions in each step are as follows:

The step of removing the resist residue shown in FIG. 3C was performed by means of an ICP-RIE system, using $O_2$, and under the conditions of gas pressure of 0.1 Pa, antenna power of 100 W, bias power of 20 W and etching time of 15 seconds.

The step of etching the second hard mask 54 to expose the surface of the first hard mask 53 shown in FIG. 3D was performed by means of an ion beam etching apparatus, using Ar, and under the conditions of gas pressure of 0.04 Pa, plasma power of 600 W, acceleration voltage of 400 V and etching time of 25 seconds.

The step of etching the first hard mask 53 to expose the surface of the magnetic recording layer 52 shown in FIG. 3E was performed by means of an ICP-RIE system, using $O_2$, and under the conditions of gas pressure of 0.1 Pa, antenna power of 500 W, bias power of 20 W and etching time of 20 seconds.

The modifying treatment to change the etching rate of the magnetic recording layer exposed in the recesses shown in FIG. 3F was performed by means of an ICP-RIE system, using $CF_4$, and under the conditions of gas pressure of 1.0 Pa, antenna power of 800 W, bias power of 0 W and etching time of 15 seconds.

The step of deactivating the magnetic recording layer 52 exposed in the recesses by the ion beam etching as shown in FIG. 3G was performed by means of a mixed gas of He—$N_2$ as an etching gas, and under the conditions of gas pressure of 0.04 Pa, plasma power of 1000 W, acceleration voltage of 1000 V and etching time of 12 seconds.

The step of removing the first hard mask 53 shown in FIG. 3H was performed by means of an ICP-RIE system, using $O_2$, and under the conditions of gas pressure of 1.5 Pa, antenna power of 400 W, bias power of 0 W and etching time of 15 seconds.

The depth of the recesses of the magnetic recording layer 52 was 8 nm when investigated by TEM observation after the process.

After a lubricant was applied to the resultant DTR medium, the DTR medium was mounted on a hard disk drive for evaluation. As a result, error rate exhibited before recording in the adjacent tracks was a good value of $10^{-6}$. After 10,000 times of recording in the adjacent tracks, fringe resistance was evaluated. The result was the error rate of $10^{-4.8}$ which showed adaptability for a DTR medium.

Comparative Example 1

A DTR medium was manufactured in the same manner as in Example 1 except that the modifying treatment to change the etching rate shown in FIG. 3F was omitted.

After the process, the depth of the recesses in the magnetic recording layer was 4 nm when measured by atomic force microscopy. After a lubricant was applied to the resultant DTR medium, the DTR medium was mounted on a hard disk drive for evaluation. As a result, error rate exhibited before recording in the adjacent tracks was a good value of $10^{-6}$. On the other hand, when the fringe resistance was evaluated after 10,000 times of recording in the adjacent tracks, the error rate was $10^{-3.6}$ which showed insufficient adaptability for a DTR medium. After being DC-magnetized, the medium was measured by magnetic force microscope (MFM). The result showed that the magnetic recording layer exposed in the recesses was not sufficiently deactivated. Therefore, it was considered that sufficient fringe resistance was not obtained due to the insufficient deactivation of the regions of recesses. This is considered to be because the penetration of the mixed gas of He—$N_2$ for deactivation into the recesses was less deep than that in the DTR medium of Example 1 which was obtained by the process comprising the modifying treatment to change etching rate.

Comparative Example 2

A DTR medium was manufactured in the same manner as in Example 1 except that the modifying treatment to change the etching rate shown in FIG. 3F was omitted and the etching time in the step of deactivation shown in FIG. 3G was changed to 24 seconds.

After the process, the depth of the recesses of the magnetic recording layer was 8 nm when measured by atomic force microscopy. After a lubricant was applied to the resultant DTR medium, the DTR medium was mounted on a hard disk drive for evaluation. As a result, error rate exhibited before recording in the adjacent tracks was a good value of $10^{-6}$. On the other hand, when the fringe resistance was evaluated after 10,000 times of recording in the adjacent tracks, the error rate was $10^{-3.9}$ which showed insufficient adaptability for a DTR medium. After being DC-magnetized, the medium was measured by MFM, and it was found that the magnetic recording layer exposed in the recesses was not sufficiently deactivated. Therefore, it was considered that sufficient fringe resistance was not obtained due to the insufficient deactivation of the regions of recesses. This is considered to be because the penetration of the mixed gas of He—$N_2$ for deactivation into the recesses was less deep than that in the DTR medium of Example 1 which was obtained by the process comprising the modifying treatment to change etching rate.

Comparative Example 3

A DTR medium was manufactured in the same manner as in Example 1 except that the modifying treatment to change the etching rate shown in FIG. 3F was omitted and the etching time in the step of deactivation shown in FIG. 3G was changed to 42 seconds.

After the process, the depth of the recesses of the magnetic recording layer was 14 nm when measured by atomic force microscopy. After a lubricant was applied to the resultant DTR medium, the DTR medium was mounted on a hard disk drive for evaluation. However, as the head flying was not stabilized, the head was crashed to reveal insufficient adaptability for a DTR medium. This is considered to be because the depth of the recesses was too large to allow stable head flying.

The conditions for the processes and the results of the measurement of Example 1 and Comparative Examples 1 to 3 are summarized in the following Table 1. Incidentally, the error rates exhibited after recording in the adjacent tracks are considered to be values to which mainly the efficiency of the deactivation is reflected.

TABLE 1

|  | Modifying treatment | Time of deactivation | Depth of recesses | Error rate[1] |
|---|---|---|---|---|
| Example 1 | Done | 12 seconds | 8 nm | $10^{-4.8}$ |
| Comparative Example 1 | None | 12 seconds | 4 nm | $10^{-3.6}$ |
| Comparative Example 2 | None | 24 seconds | 8 nm | $10^{-3.9}$ |
| Comparative Example 3 | None | 42 seconds | 14 nm | —[2] |

[1]Error rate exhibited after 10,000 times of recording in adjacent tracks
[2]Incapable of measurement due to head crash From the results shown in Table 1, it is found that by using a step of modifying treatment as in the method of the present invention, deactivation can be efficiently performed in a shorter etching time with a small depth of recesses.

Example 2

DTR media were manufactured in the same manner as in Example 1 except that the gas used in the step of modifying treatment shown in FIG. 3F was changed. In the present example, $CF_4$, $SF_6$, $CHF_3$ or Ar was used in the modifying treatment step, and four types of media were manufactured for evaluation.

After the process, the depth of the recesses of the magnetic recording layer was about 8 nm when measured by atomic force microscopy, although it varied depending on the gas used in the modifying treatment to change the etching rate.

After a lubricant was applied to the resultant DTR medium, the DTR medium was mounted on a hard disk drive for evaluation. As a result, the error rate exhibited before recording in the adjacent tracks was a good value of $10^{-6}$ in the three types of DTR medium other than that manufactured by using Ar in the modifying treatment to change the etching rate. When the fringe resistance was evaluated after 10,000 times of recording in the adjacent tracks, the error rate was $10^{-4.8}$ which showed adaptability for a DTR medium.

As for the DTR medium manufactured by using Ar in the modifying treatment to change the etching rate, although the error rate exhibited before recording in the adjacent tracks was a good value of $10^{-6}$, fringe resistance was inferior, showing insufficient adaptability for a DTR medium. After being DC-magnetized, the medium was measured by MFM, and it was found that the magnetic recording layer exposed in the recesses was not sufficiently deactivated. Therefore, it was considered that sufficient fringe resistance was not obtained due to the insufficient deactivation of the regions of recesses.

The results above are summarized in Table 2.

TABLE 2

Modifying treatment to change etching rate and resulting adaptability for DTR medium

| | Adaptability for DTR medium |
|---|---|
| $CF_4$ | good |
| $SF_6$ | good |
| $CHF_3$ | good |
| Ar | insufficient |

As shown above, it is understandable that when the modifying treatment to change etching rate is reactive ion etching which uses $CF_4$, $SF_6$ or $CHF_3$, it is possible to efficiently deactivate the regions of recesses.

Example 3

A DTR medium was manufactured in the same manner as in Example 1 except that the conditions of the process were changed in the step of deactivation shown in FIG. 3G. In the present example, each of seven types of gas, i.e., He, $O_2$, $N_2$, He—$N_2$, He—$O_2$, He—$N_2$—$O_2$ and Ar was used as a deactivating gas in the step of deactivation. Etching time was adjusted for each type of gas so as to provide recesses with a depth of 8 nm after processing which were equal to those in Example 1. The conditions of the process other than gas and etching time were the same as those in Example 1.

After a lubricant was applied to the resultant DTR medium, the DTR medium was mounted on a hard disk drive for evaluation. As a result, error rate exhibited before recording in the adjacent tracks was a good value of $10^{-6}$ in all of the seven types of medium. When the fringe resistance was evaluated after 10,000 times of recording in the adjacent tracks, the error rate was about $10^{-4.8}$ in every medium except that manufacture by using Ar as the gas for deactivation, which showed adaptability of every six types of media for a DTR medium.

As for the DTR medium wherein Ar was used as a gas for deactivation, when the fringe resistance was evaluated after 10,000 times of recording in the adjacent tracks, the value was about $10^{-3.7}$, which showed insufficient adaptability for a DTR medium. After being DC-magnetized, the medium was measured by MFM. The result showed that the magnetic recording layer exposed in the recesses was not sufficiently deactivated. Therefore, it was considered that sufficient fringe resistance was not obtained due to the insufficient deactivation of the regions of recesses.

As described above, it is understandable that when the gas for deactivation is He, $O_2$, $N_2$, He—$N_2$, He—$O_2$ or He—$N_2$—$O_2$, the regions of recesses can efficiently be deactivated.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
    forming a first hard mask, a second hard mask and a resist on a magnetic recording layer;
    imprinting a stamper to the resist to transfer patterns of protrusions and recesses to the resist;
    removing residues in the recesses of the patterned resist;
    etching the second hard mask by using the patterned resist as a mask to transfer the patterns of protrusions and recesses to the second hard mask;
    etching the first hard mask by using the second hard mask as a mask to transfer the patterns of protrusions and recesses to the first hard mask;
    processing the magnetic recording layer exposed in the recesses with a modifying treatment by reactive ion etching comprising a gas selected from the group consisting of $CF_4$, $SF_6$ and $CHF_3$ to increase an etching rate with regard to ion beam etching; and deactivating the magnetic recording layer exposed in the recesses by ion beam etching using a gas selected from the group consisting of He, $O_2$, $N_2$, a mixed gas of He—$N_2$, a mixed gas of He—$O_2$ and a mixed gas of He—$N_2$—$O_2$.

2. The method of claim 1, wherein the second hard mask is removed by ion beam etching.

3. The method of claim 1, wherein the second hard mask is removed by the modifying treatment.

4. The method of claim 1, wherein the ion beam etching is performed under the condition of etching time of 12 seconds.

5. The method of claim 1, wherein the thickness of the first hard mask is 4 nm to 50 nm.

6. The method of claim 1, wherein the thickness of the second hard mask is 1 nm to 15 nm.

7. The method of claim 1, wherein the thickness of the second hard mask is 2 nm to 10 nm.

8. The method of claim 1, wherein the magnetic recording medium is a discrete track recording medium or a bit-patterned medium.

9. The method of claim 1, wherein the magnetic recording layer exposed in the recesses are changed into modified regions to a certain depth from the surface of the layer by the modifying treatment.

10. The method of claim 9, wherein the modified regions are removed by ion beam etching.

* * * * *